US011468680B2

(12) United States Patent
Sharma et al.

(10) Patent No.: US 11,468,680 B2
(45) Date of Patent: Oct. 11, 2022

(54) SHUFFLE, ATTEND, AND ADAPT: VIDEO DOMAIN ADAPTATION BY CLIP ORDER PREDICTION AND CLIP ATTENTION ALIGNMENT

(71) Applicant: NEC Laboratories America, Inc., Princeton, NJ (US)

(72) Inventors: Gaurav Sharma, Newark, CA (US); Samuel Schulter, New York, NY (US); Jinwoo Choi, Blacksburg, VA (US)

(73) Assignee: NEC Corporation

( * ) Notice: Subject to any disclaimer, the term of this patent is extended or adjusted under 35 U.S.C. 154(b) by 231 days.

(21) Appl. No.: 16/998,404

(22) Filed: Aug. 20, 2020

(65) Prior Publication Data

US 2021/0064883 A1 Mar. 4, 2021

Related U.S. Application Data

(60) Provisional application No. 62/935,674, filed on Nov. 15, 2019, provisional application No. 62/892,047, filed on Aug. 27, 2019.

(51) Int. Cl.
*G06K 9/62* (2022.01)
*G06N 3/04* (2006.01)
*G06V 20/40* (2022.01)
*G06N 3/08* (2006.01)
*G06V 40/20* (2022.01)

(52) U.S. Cl.
CPC .......... *G06V 20/48* (2022.01); *G06K 9/6259* (2013.01); *G06N 3/0481* (2013.01); *G06N 3/08* (2013.01); *G06V 20/41* (2022.01); *G06V 20/46* (2022.01); *G06V 40/20* (2022.01)

(58) Field of Classification Search
None
See application file for complete search history.

(56) References Cited

U.S. PATENT DOCUMENTS

2020/0237452 A1* 7/2020 Wolf ........................ G06F 3/048

OTHER PUBLICATIONS

Carriera et al. "A New Model and the Kinetics Dataset", IEEE Conference on Computer Vision and Pattern Recognition. 2017. pp. 6299-6308.
Ganin et al., "Unsupervised Domain Adaptation by Backpropagation", Proceedings of the 32nd International Conference on Machine Learning. 2015. JMLR:W&CP, vol. 37. pp. 1-10.
Barekatain et al., "Okutama-Action: An Aerial View Video Dataset for Concurrent Human Action Detection", Proceedings of the IEEE Conference on Computer Vision and Pattern Recognition Workshops. 2017. pp. 28-35.
Chen et al., "Temporal Attentive Alignment for Large-Scale Video Domain Adaptation", Proceedings of the IEEE International Conference in Computer Vision (ICCV). 2019. pp. 6321-6330.

* cited by examiner

*Primary Examiner* — Idowu O Osifade
(74) *Attorney, Agent, or Firm* — Joseph Kolodka

(57) ABSTRACT

A method for performing video domain adaptation for human action recognition is presented. The method includes using annotated source data from a source video and unannotated target data from a target video in an unsupervised domain adaptation setting, identifying and aligning discriminative clips in the source and target videos via an attention mechanism, and learning spatial-background invariant human action representations by employing a self-supervised clip order prediction loss for both the annotated source data and the unannotated target data.

20 Claims, 7 Drawing Sheets

SHUFFLE, ATTEND, AND ADAPT: VIDEO DOMAIN ADAPTATION BY CLIP ORDER PREDICTION AND CLIP ATTENTION ALIGNMENT

RELATED APPLICATION INFORMATION

This application claims priority to Provisional Application No. 62/892,047, filed on Aug. 27, 2019, and Provisional Application No. 62/935,674, filed on Nov. 15, 2019, the contents of which are incorporated herein by reference in their entirety.

BACKGROUND

Technical Field

The present invention relates to computer vision techniques and, more particularly, to methods and systems for performing video adaptation by aligning features of frames or clips of source and target videos.

Description of the Related Art

Recent computer vision-based methods have reached very high performances in supervised tasks and many real-world applications have been made possible, such as image search, face recognition, automatic video tagging, etc. The main reasons for success are high capacity network design with an associated practical learning method and large amounts of annotated data. While the first aspect is scalable, in terms of deployment to multiple novel scenarios, the second aspect becomes the limiting factor. The annotation issue is even more complicated in video-related tasks, as temporal annotation is needed, e.g., the start and end of actions in long videos needs to be specified.

SUMMARY

A computer-implemented method for performing video domain adaptation for human action recognition is presented. The method includes using annotated source data from a source video and unannotated target data from a target video in an unsupervised domain adaptation setting, identifying and aligning discriminative clips in the source and target videos via an attention mechanism, and learning spatial-background invariant human action representations by employing a self-supervised clip order prediction loss for both the annotated source data and the unannotated target data.

A non-transitory computer-readable storage medium comprising a computer-readable program is presented for performing video domain adaptation for human action recognition, wherein the computer-readable program when executed on a computer causes the computer to perform the steps of using annotated source data from a source video and unannotated target data from a target video in an unsupervised domain adaptation setting, identifying and aligning discriminative clips in the source and target videos via an attention mechanism, and learning spatial-background invariant human action representations by employing a self-supervised clip order prediction loss for both the annotated source data and the unannotated target data.

A system for performing video domain adaptation for human action recognition is presented. The system includes a memory and one or more processors in communication with the memory configured to use annotated source data from a source video and unannotated target data from a target video in an unsupervised domain adaptation setting, identify and align discriminative clips in the source and target videos via an attention mechanism, and learn spatial-background invariant human action representations by employing a self-supervised clip order prediction loss for both the annotated source data and the unannotated target data.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
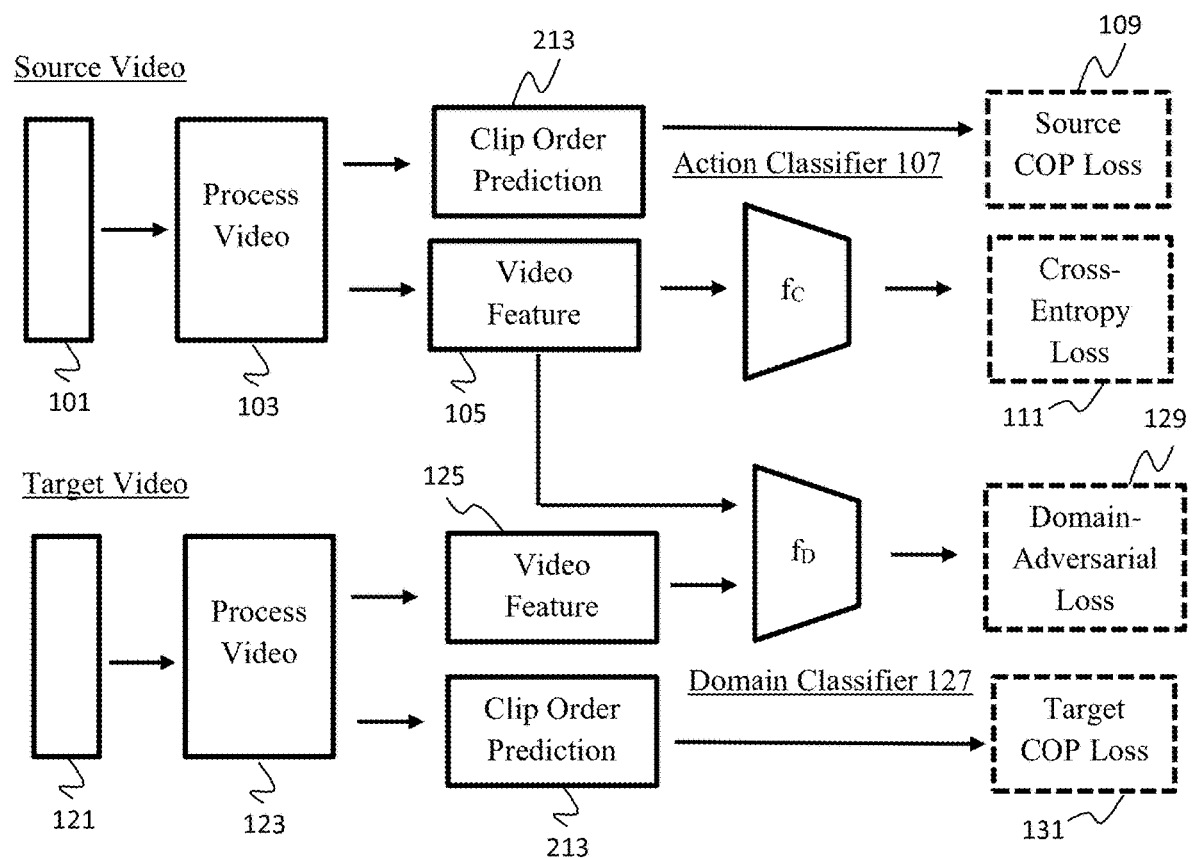
FIG. 1 is a block/flow diagram of overall training for the Shuffle and Attend: Video domain Adaptation (SAVA) method, in accordance with embodiments of the present invention.

Domain adaptation has emerged as an important issue in computer vision technology. The applications of domain adaptation have ranged from simple classification to more complex tasks such as semantic segmentation and object detection. However, the application on video tasks e.g., action recognition is still limited.

The exemplary embodiments address this less studied but challenging and practically important task of video domain adaptation for human action recognition. The exemplary embodiments primarily relate to an unsupervised domain adaptation setting. That is, the exemplary embodiments use annotated data for the source domain and only unannotated data for the target domain. Example domains that are employed include, but are not limited to, (human) actions from movies, unconstrained actions from sports videos, YouTube videos, and videos taken from drones.

The exemplary embodiments exploit insights related to such issue and introduce several novel adaptation components. First, it is noted that the existing domain adaptation methods, when applied directly to the video adaptation task, sample frames or clips, depending on whether the video encoding is based on a 2D network, e.g., temporal relation network or a 3D network, e.g., C3D, which is a convolutional 3D network. The exemplary embodiments sample clips (or frames) and then average the final outputs from multiple clips at test time, following the video classification networks they are built upon. Performing domain adaptation by aligning features for all sampled clips is suboptimal, as a lot of network capacity is wasted on aligning clips that are not crucial for the task. In a worst-case scenario, it can even be detrimental if a large number of unimportant clips dominate the learning loss and adversely affect the alignment of important clips. For example, in various clips including the action of "punching," video from a first domain and video from a second domain can have the same action, that is, "punching." However, the video from the second domain can include a lot of clips irrelevant to the action of "punching." Aligning features from those irrelevant clips would not improve the target performance much.

Second, this clip-wise training method is likely to exploit correlations in the scene context for discriminating the action classes, e.g., in a formal sports-oriented dataset fencing might happen in a gym only as shown in a certain number of videos. However, in the domain adaptation setting, the target domain might have vastly different scene contexts, e.g., the same fencing might happen in a living room or dining room, as shown in a different set of videos. When the source model uses the correlated gym information to predict a fencing action, it may perform poorly on the same class in the target domain, which does not have a gym scene. Similar scene context corruption issues have been identified for transfer learning, and few conventional works have addressed the issue of debiasing the representations explicitly.

Based on the above insights, the exemplary embodiments introduce Shuffle and Attend: Video domain Adaptation (SAVA) with several novel components. First, the exemplary embodiments identify and align important (which is defined as discriminative) clips in source and target videos via an attention mechanism. The attention mechanism leads to the suppression of temporal background clips, which helps the exemplary method focus on aligning only the important or discriminative clips. Such attention is learned jointly for video-level adaptation and classification. The exemplary embodiments estimate the clip's importance by employing an auxiliary network and derive the video feature as a weighted combination of the identified important/discriminative clip features.

Second, the exemplary embodiments learn spatial-background invariant human action representations by employing a self-supervised clip order prediction task. While there could be some correlation between the scene context/background and the action class, e.g., soccer field for "kicking the ball" action, the scene context is not sufficient for predicting the temporal clip order. In contrast, the actual human actions are indicative of the temporal order, e.g., for "kicking the ball" action, the clip order follows roughly the semantics of "approaching the ball," "swinging the leg," and "kicking." If the clips are shuffled, the actual human action representation would be able to recover the correct order, but the scene context-based representation would likely fail.

Thus, using the clip order prediction-based loss helps counter the scene context corruption in the action representations and improves adaptation performance. The exemplary embodiments employ the self-supervised clip order prediction task for both source and target data. As this auxiliary task is self-supervised, it does not need any annotation (which is not had for target videos).

The advantages of the exemplary embodiments of the present invention are at least as follows:

The exemplary embodiments learn to align important (discriminative) clips to achieve improved representation for the target domain. The exemplary embodiments employ a self-supervised task which encourages the model to focus more on actual action and suppresses the scene context information to learn representations more robust to domain shifts. The self-supervised task does not need extra annotations.

The exemplary embodiments relate to an unsupervised domain adaptation setting, where source data $(x_s, y_s) \in X^s \times Y^s$ is annotated, where $X^s$ is a set of videos including human-centered videos and $Y^s$ is an actions label set, and unannotated target data $x_t \in X^t$. The task is to train a model using all the data, which performs well on the target data. Since the source data distribution, e.g., actions in movies, is expected to be very different from the target data distribution, e.g., actions in sports videos, the model trained on the source data only does not work well on target videos. The challenge is to design methods that can adapt a model to work on the target data, using both annotated source data and unannotated target data. The exemplary method, at a high level, uses the following components for adaptation, that is, domain adversarial loss, clip order prediction losses, and an attention module or mechanism for generating video features.

Figure 2:
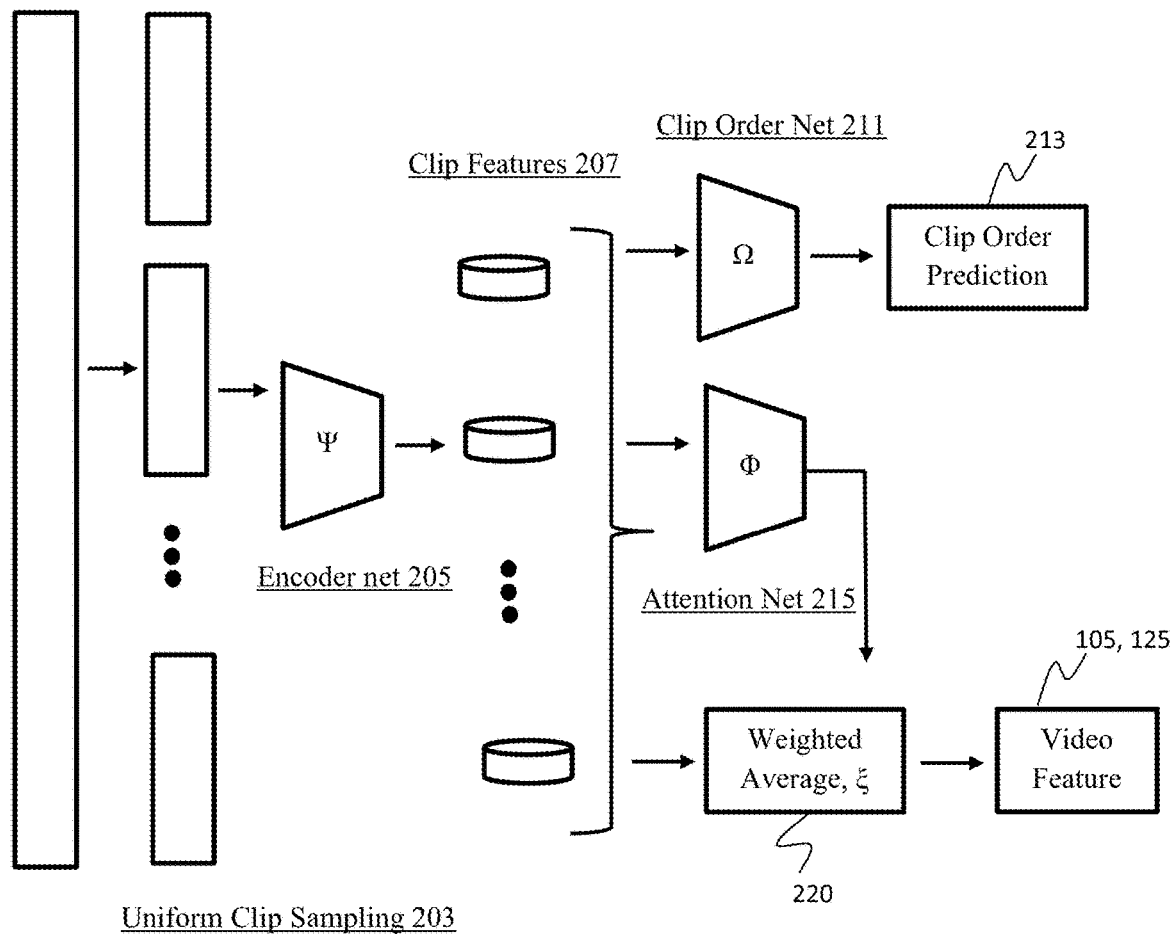
FIG. 2 is a block/flow diagram of a process video block for the SAVA method, in accordance with embodiments of the present invention.

FIGS. 1 and 2 provide an overview of the exemplary method, which is referred to as Shuffle and Attend Video domain Adaptation (SAVA). The exemplary method starts with uniformly sampling N clips, with L frames, from an arbitrary length input video, as shown in the process video blocks 103, 123 of FIG. 1. The exemplary method encodes source clips 101 and target clips 121 into clip features 207 (by feature extraction 305) by an encoder network $\Psi(\cdot)$ or 205, which can be either the same for both or different. Here it is assumed it is the same for the brevity of notation. Then, the exemplary method uses the clip features for the clip order prediction network $\Omega(\cdot)$ or 211 to perform clip order prediction 213, and constructing the video-level features 105, 125 using the attention network $\Phi(\cdot)$ or 215. The video level features 105, 125 obtained after the attention network, are then used with linear action classifier 107, for source videos only, and domain classifier 127, for both source and target videos 101, 121.

In total, there are three types of losses that are optimized, domain adversarial loss 129, clip order prediction losses for both source and target 109, 131, and classification loss 111 for source only. The clip order prediction losses 109, 131 work with clip level features, while the other two losses 111, 129 work on video-level features. The clip order prediction losses 109, 131 help the model to learn a representation that is less reliant on correlated source data background. The attention network provides the final video feature by focusing on important or discriminative clips. The domain adversarial loss 129 helps the model to align video-level features between source and target videos 101, 121. All these losses are jointly learned and hence lead to a trained system that provides aligned representations and achieves higher action classification performance than the baselines.

As shown in FIG. 1, the source videos 101 of the same class may have correlations with similar background context, and the target videos 121 of the same class might have a background which is vastly different from the source background. While the source model might benefit from learning representation, which is partially dependent on the correlated background, this would lead to poor target classification. To address this issue, the exemplary method employs clip order prediction (COP) to enable better generalization of the representation. COP would not be very accurate if the model focuses on the background as the background might not change significantly over time. However, the temporal evolution of the clip depends more on the humans performing actions, and possibly the objects. Thus, if the exemplary embodiments employ the COP, the representation would focus more on the relevant humans and objects, while relying less on the background.

Figure 3:
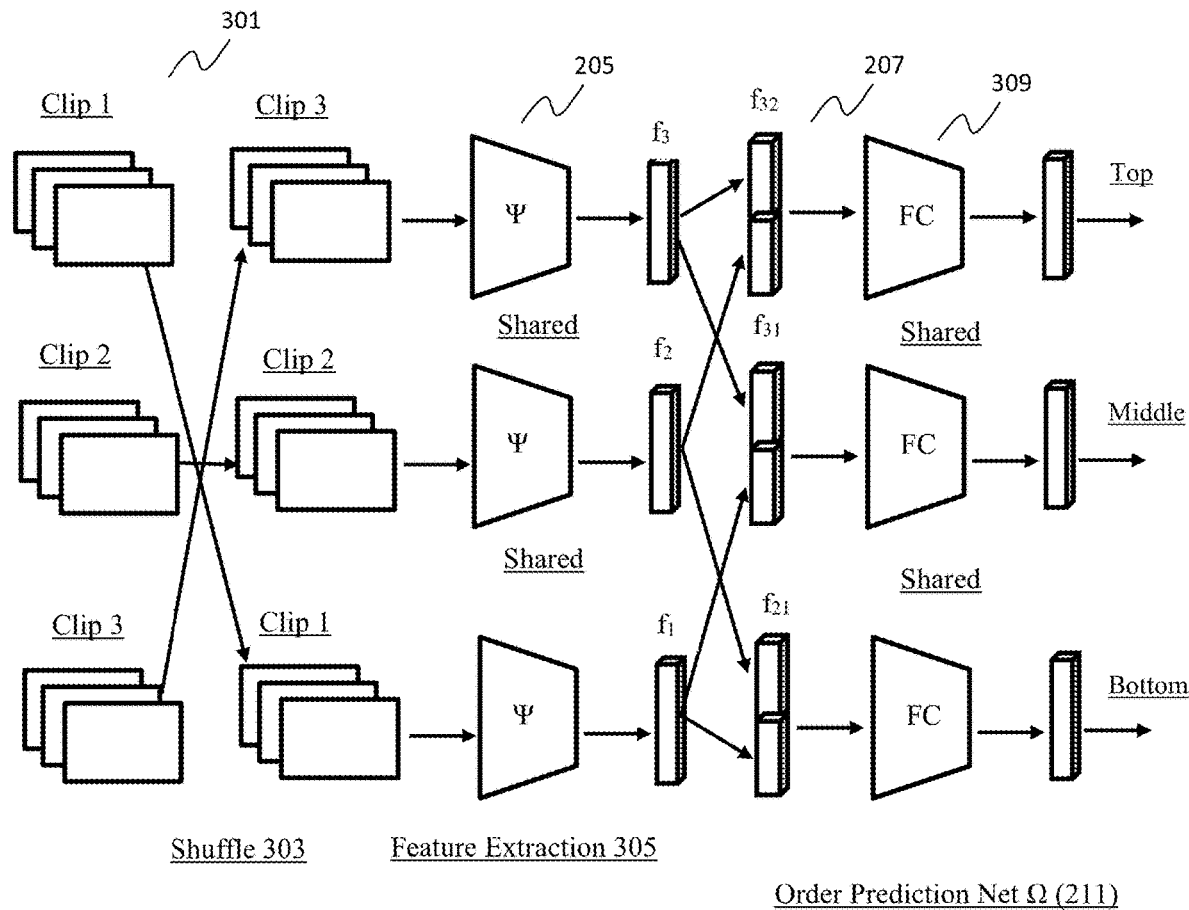
FIG. 3 is a block/flow diagram of an exemplary clip order prediction network, in accordance with embodiments of the present invention.
Figure 3:
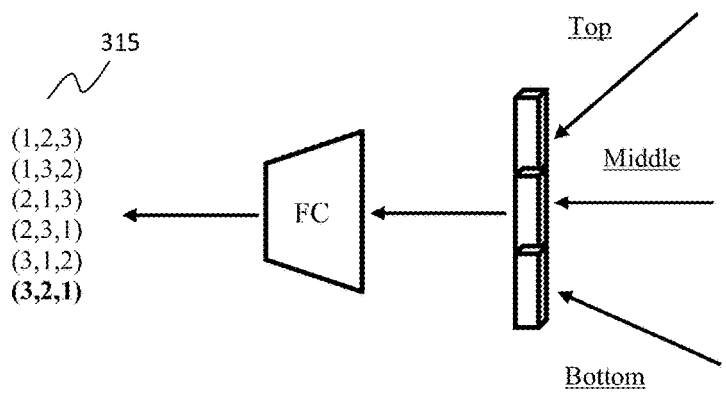

The exemplary embodiments show the illustration of the COP network $\Omega$ (or 211) in FIGS. 2 and 3. The exemplary embodiments incorporate an auxiliary network, taking clip features 207 as input, to predict the correct order of shuffled clips of an input video 201. The exemplary embodiments sample M clips 203, with L frames each, from the input video 201 and shuffle (303) the clips 301. The task of the module is to predict the order of the shuffled clips. The exemplary embodiments formulate the COP task as a classification task with M! classes, corresponding to all permutation tuples of the clips, and consider the correct order tuple as the ground truth class. The exemplary embodiments concatenate clip features pairwise (207) and pass them to a fully connected layer 309 with ReLU activation followed by a dropout layer. Then the exemplary embodiments concatenate all of the output features and use a final linear classifier to predict the order 315 of the input clips 301. Since this is a self-supervised task and needs no extra annotation, the exemplary embodiments can use the task for the videos from source, target, or both.

Regarding clip-attention based video-level features, as shown in FIGS. 1 and 2, all clips are not equally important (discriminative or relevant) for predicting the action. Aligning the irrelevant clip features is suboptimal, and it might even degrade performance if the irrelevant clips dominate the loss of the important or discriminative clips. Focusing on and aligning the important clips would lead to better adaptation and classification performance. To achieve such focus on important clips, the exemplary methods employ a clip attention module. The attention module takes N number of clip features as inputs, and outputs N softmax scores indicating the importance of each of them. The final video-level feature is obtained by the weighted average of the clip features. Formally, given $x_1, \ldots, x_N$, as the N clips from an input video x, the exemplary method obtains the video-level feature $x_v$ as:

$$w = \Phi(\Psi(x_1), \ldots, \Psi(x_N)), \quad x^v = \xi(w, \Psi(x_1), \ldots, \Psi(x_N)) = \sum_{i=1}^{N} \omega_i \Psi(x_i)$$

where, $\xi(\cdot)$ is a weighted average function 220 (FIG. 2).

The attention module $\Phi(\cdot)$ is a network that takes N clip features with D dimension as an input. The attention module outputs an importance vector $w \in \mathbb{R}^N$, which is used for weighted averaging to obtain the video-level feature 105, 125. Thus, the exemplary method can train the model end-to-end with a full domain adaptation system.

There can be multiple valid choices for the architecture of the attention module, e.g., a standard feed-forward network which takes concatenation of the clip features as input, or a recurrent network that consumes the clip features one by one.

Regarding training, the exemplary embodiments pre-train the attention module with standard binary cross-entropy loss 111, where the method obtains the ground truth attention vector as follows. The ground truth label is 1 if the clip is correctly classified by the baseline clip-based classification network and has confidence higher than a threshold $c_{th}$, and 0 otherwise. The pre-training allows the attention module to start from good local optima, mimicking the baseline classifier. Once pre-trained, the attention module can then either be fixed or can be trained end-to-end with the rest of the network. It is noted that the exemplary method trains the attention module only on the source dataset as the training needs ground truth action labels.

For the feature distribution alignment, the exemplary method follows the adversarial domain adaptation framework of adversarial discriminative domain adaptation (ADDA).

The exemplary method defines the losses as:

$$L_{CE} = -\mathbb{E}_{(x_s, y_s) \sim (X^s, Y^s)} \sum_{k=1}^{X} [y_{s,k} \log f_C(x_s^v)],$$

$$L_{ADV_{f_D}} = -\mathbb{E}_{x_s \sim X^s}[\log f_D(x_s^v)] - \mathbb{E}_{x_t \sim X^t}[\log(1 - f_D(x_t^v))]$$

$$L_{ADV_{\psi_t}} = -\mathbb{E}_{x_t \sim X^t}[\log f_D(x_t^v)],$$

where $f_C$ is the linear source classifier and $f_D$ is the domain classifier. The video feature $x^v = \xi(w, \Psi(x_1), \ldots, \Psi(x_N))$ is the weighted average of clip level features, with weights $w = \Phi(\Psi(x_1), \ldots, \Psi(x_N))$ obtained from the attention module.

Then the optimization objective is given as follows:

$$\theta_s^*, \theta_{f_C}^*, \theta_\Phi^* = \underset{\theta_s, \theta_{f_C}}{\operatorname{argmin}} L_{CE, \theta_\Phi}, \quad \theta_{f_D}^* = \underset{\theta_{f_D}}{\operatorname{argmin}} L_{ADV_{f_D}}, \quad \theta_t^* = \underset{\theta_t}{\operatorname{argmin}} L_{ADV_{\psi_t}}$$

where $\theta_s$ is the parameter of the source encoder $\Psi_s(\cdot)$, $\theta_{f_C}$ is the parameter of the source classifier $f_C(\cdot)$, $\theta_t$ is the parameter of the target encoder $\Psi_t(\cdot)$, and $\theta_{f_D}$ is the parameter of the domain classifier $f_D(\cdot)$.

The exemplary method optimizes this objective function in a stage-wise fashion. The exemplary method first optimizes the source cross-entropy loss $L_{CE}$ over the source parameters $\theta_s$ and $\theta_{f_C}$ with the annotated source data. Then the exemplary method freezes source model parameters $\theta_s$ and $\theta_{f_C}$, and optimizes the domain classification loss $$L_{ADV_{f_D}}$$

over the domain classifier parameter $\theta_{f_D}$ and the inverted GAN loss $$L_{ADV_{\psi_t}}$$

over the target encoder parameter $\theta_t$ with both the labeled source and the unlabeled target data.

For clip order prediction 213, the COP loss is defined as:

$$L_{COP} = -\mathbb{E}_{(x,y) \sim (X,Y)} \sum_{k=1}^{M!} [y_k \log f_O(\phi)]$$

Here, $f_O$ is the linear classification function for the COP, $\phi=\Omega(\Phi(x_1), \ldots, \Phi(x_M))$ is the ReLU activation of the MLP which takes M clip features as input. The exemplary method can employ the $L_{COP}$ for both source and target. The exemplary method optimizes the loss $L_{COP}$ over the source encoder parameter $\theta_s$, target encoder parameter $\theta_t$, COP MLP parameter $\theta_\Omega$, and clip order classifier parameter $\theta_{f_O}$.

Regarding inference, at inference time, the exemplary method removes the domain discriminator and clip order prediction network. The exemplary method divides the input video into N clips and extracts clip features. These features are then weight averaged with weights obtained using the attention network. The action classifier predicts the action using the video-level feature.

Figure 4:
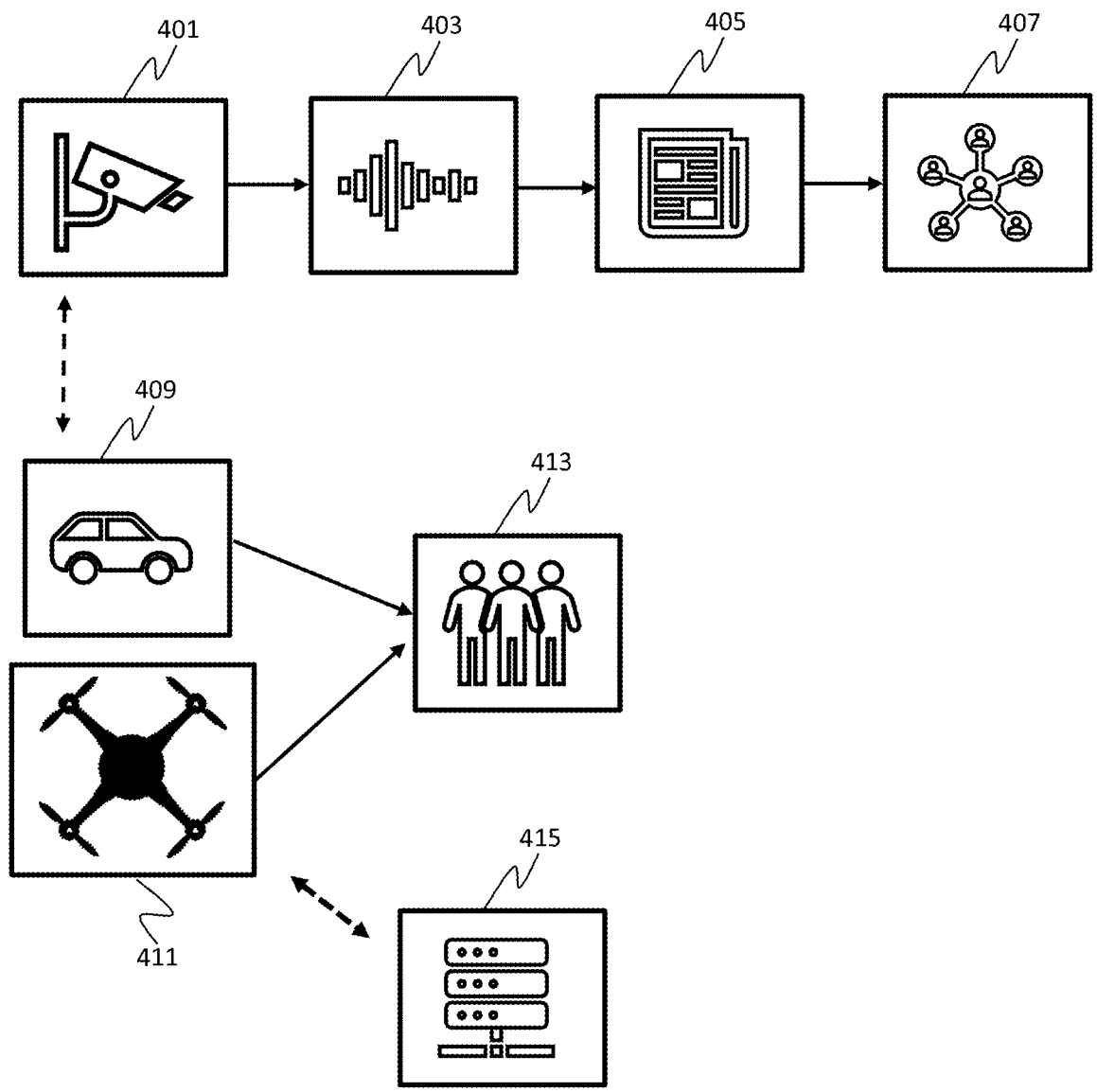
FIG. 4 is a block/flow diagram of a practical application for the SAVA method, in accordance with embodiments of the present invention.

FIG. 4 is a block/flow diagram of a practical application for the SAVA method, in accordance with embodiments of the present invention.

A camera 401 attached to a car 409 or drone 411 can sample videos 403 to extract images or clips 405 to be processed by the SAVA method 407. The images or clips 405 include human actions 413.

In particular, a domain adaptation method for human action recognition in videos is employed which can take annotated videos of a source domain, e.g., third person videos, along with unannotated videos of a target domain, e.g., videos from drones 411, or a car mounted camera 409, and can learn a classifier for classifying the target domain videos. This is a generally applicable scenario, when large amounts of source videos have annotation but the amount of annotations available on the target domain videos is very less (and is expensive to collect). The objective is to leverage the annotation on the source domain to learn a better classifier for the target domain. The SAVA method 407 is a novel solution to this issue.

As one possible use case, a drone 411 can fly around in an area taking videos 403 of the human subjects 413, which are processed by the SAVA method 407. The SAVA method 407 might be running on the drone 411 itself or on a remote server 415 with which the drone 411 communicates. Once the human actions 413 are captured, they are classified into categories such as walking, running, throwing objects, etc., which can be used for surveillance, prevention, and searching, etc. Similar deployments are possible with other video domains such as from vehicle mounted cameras 409.

The exemplary method aims to do adaptation of the source only (e.g., third person) classifier to perform well on the target domain (e.g., drone or first-person videos).

The setting targeted is when the target annotations of the main task are not available (e.g., they are very expensive to obtain), but there are other auxiliary tasks whose annotations are available in target (and possibly source) domain. An example of main task can be action recognition, and some examples of auxiliary tasks can be, but are not limited to, segmentation, optical flow estimation, object detection, clip order prediction, etc.

By performing such multitask adaptation where the main task has annotation in source and not in target while many auxiliary tasks have annotation in either both source and target or at least one of them, the classifier can be better adapted to the target.

In conclusion, the exemplary embodiments introduced Shuffle and Attend: Video domain Adaptation (SAVA), a novel video domain adaptation method with self-supervised clip order prediction and clip attention-based feature alignment. Moreover, the exemplary embodiments address the issue of domain adaptation in videos for the task of human action recognition. Inspired by image-based domain adaptation, the exemplary methods can perform video adaptation by aligning the features of frames or clips of source and target videos. However, equally aligning all clips is suboptimal as not all clips are informative for the task. The exemplary methods introduce an attention mechanism which focuses on more discriminative clips and directly optimizes for video-level (clip-level) alignment. As the backgrounds are often very different between source and target, the source background-corrupted model adapts poorly to target domain videos. To alleviate this, the exemplary methods introduce the use of clip order prediction as an auxiliary task. The clip order prediction loss, when combined with domain adversarial loss, encourages learning of representations which focus on the humans and objects involved in the actions, rather than the uninformative and widely differing (between source and target) backgrounds.

Figure 5:
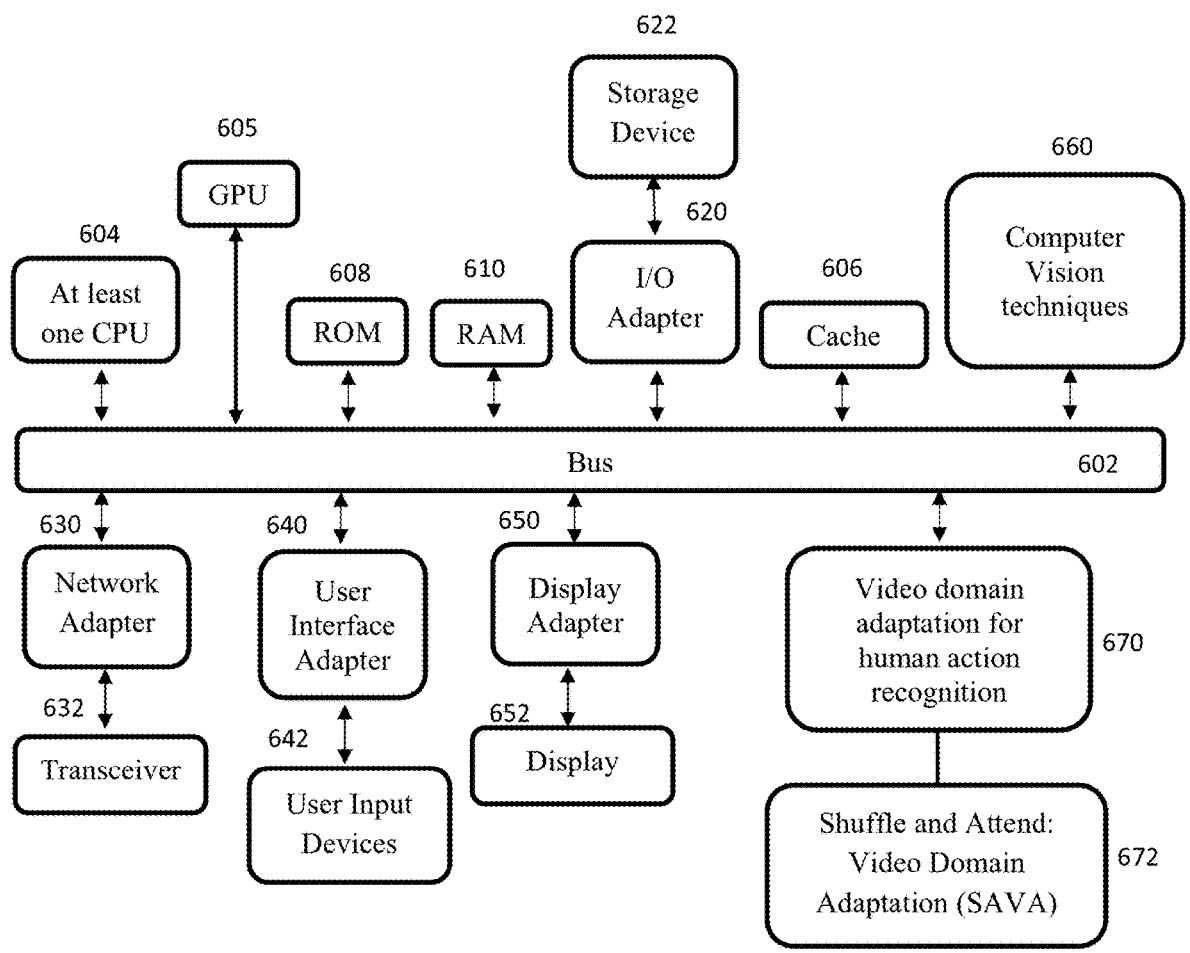
FIG. 5 is block/flow diagram of an exemplary processing system for performing video domain adaptation for human action recognition, in accordance with embodiments of the present invention.

FIG. 5 is block/flow diagram of an exemplary processing system for performing video domain adaptation for human action recognition, in accordance with embodiments of the present invention.

The processing system includes at least one processor or processor device (CPU) 604 and a graphics processing unit (GPU) 605 operatively coupled to other components via a system bus 602. A cache 606, a Read Only Memory (ROM) 608, a Random Access Memory (RAM) 610, an input/output (I/O) adapter 620, a network adapter 630, a user interface adapter 640, and a display adapter 650, are operatively coupled to the system bus 602. Computer Vision techniques 660 can be employed via the bus 602. Computer Vision techniques 660 can be accomplished by employing video domain adaptation for human action recognition 670 via a SAVA method 672.

A storage device 622 is operatively coupled to system bus 602 by the I/O adapter 620. The storage device 622 can be any of a disk storage device (e.g., a magnetic or optical disk storage device), a solid-state magnetic device, and so forth.

A transceiver 632 is operatively coupled to system bus 602 by network adapter 630.

User input devices 642 are operatively coupled to system bus 602 by user interface adapter 640. The user input devices 642 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 642 can be the same type of user input device or different types of user input devices. The user input devices 642 are used to input and output information to and from the processing system.

A display device 652 is operatively coupled to system bus 602 by display adapter 650.

Of course, the processing system may also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, processor devices, controllers, memories, and so forth, in various configurations can also be utilized as readily appreciated by one of ordinary skill in the art. These and other variations of the processing system are readily contemplated by one of ordinary skill in the art given the teachings of the present invention provided herein.

Figure 6:
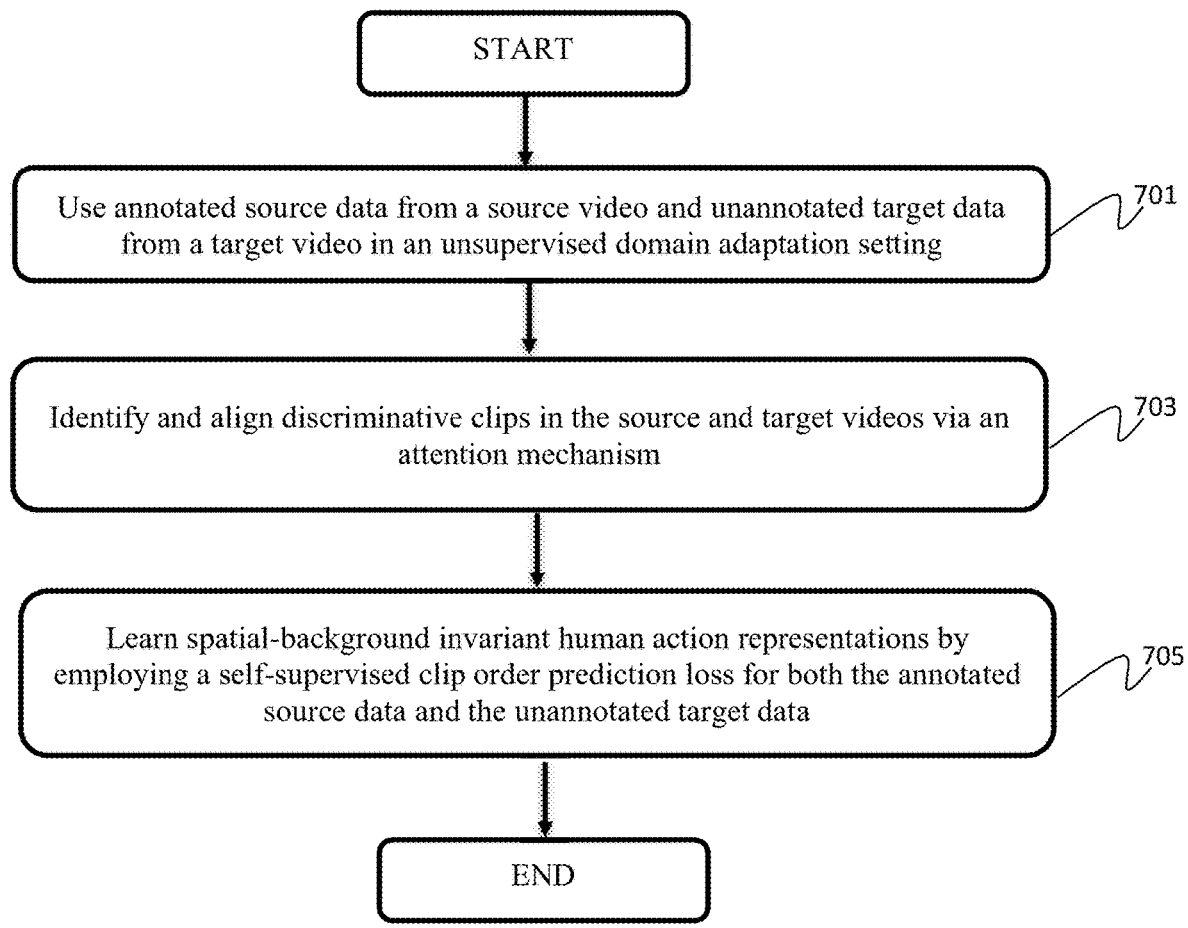
FIG. 6 is a block/flow diagram of an exemplary method for performing video domain adaptation for human action recognition, in accordance with embodiments of the present invention.

FIG. 6 is a block/flow diagram of an exemplary method for performing video domain adaptation for human action recognition, in accordance with embodiments of the present invention.

At block 701, use annotated source data from a source video and unannotated target data from a target video in an unsupervised domain adaptation setting.

At block 703, identify and align discriminative clips in the source and target videos via an attention mechanism.

At block 705, learn spatial-background invariant human action representations by employing a self-supervised clip order prediction loss for both the annotated source data and the unannotated target data.

Figure 7:
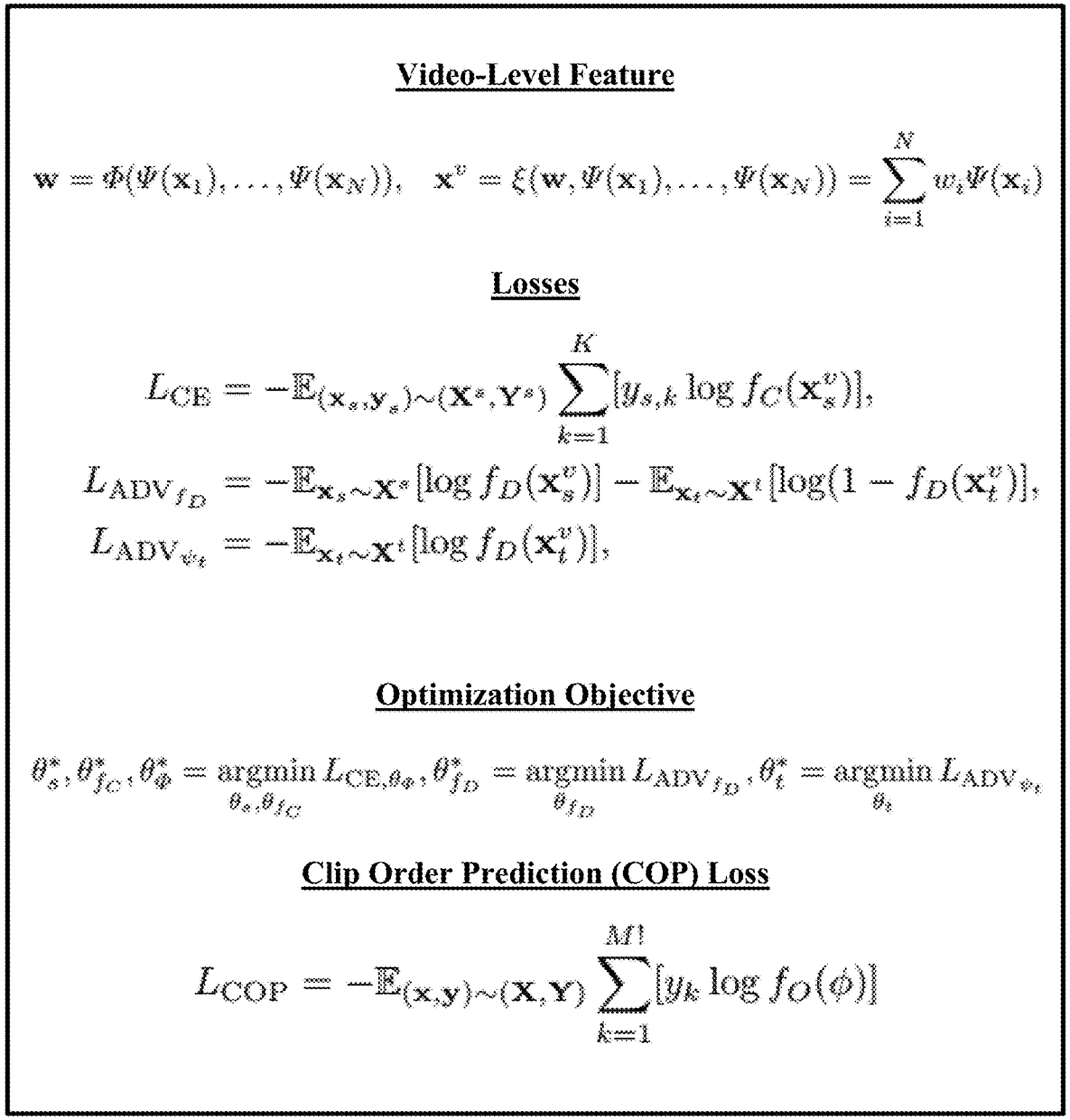
FIG. 7 is a block/flow diagram of equations employed in an exemplary method for performing video domain adaptation for human action recognition, in accordance with embodiments of the present invention.

FIG. 7 is a block/flow diagram of equations employed in methods for performing video domain adaptation for human action recognition, in accordance with embodiments of the present invention.

Equations 800 identify video-level features, losses, optimization objectives, and clip order prediction losses.

As used herein, the terms "data," "content," "information" and similar terms can be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data can be received directly from the another computing device or can be received indirectly via one or more intermediary computing devices, such as, for example, one or more servers, relays, routers, network access points, base stations, and/or the like. Similarly, where a computing device is described herein to send data to another computing device, the data can be sent directly to the another computing device or can be sent indirectly via one or more intermediary computing devices, such as, for example, one or more servers, relays, routers, network access points, base stations, and/or the like.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "calculator," "device," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can include, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks or modules.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks or modules.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method executed on a processor for performing video domain adaptation for human action recognition, the method comprising:
using annotated source data from a source video and unannotated target data from a target video in an unsupervised domain adaptation setting;
identifying and aligning discriminative clips in the source and target videos via an attention mechanism; and
learning spatial-background invariant human action representations by employing a self-supervised clip order prediction loss for both the annotated source data and the unannotated target data.

2. The method of claim 1, wherein the attention mechanism suppresses temporal background clips.

3. The method of claim 2, wherein the attention mechanism is learned jointly for video-level adaptation and classification.

4. The method of claim 3, wherein the discriminative clips are selected by employing an auxiliary network such that video features are derived as a weighted combination of the identified discriminative clips.

5. The method of claim 4, wherein the attention mechanism is pre-trained with a binary cross-entropy loss to obtain a ground truth attention vector.

6. The method of claim 1, wherein the clip order prediction (COP) loss is given as:

$$L_{COP} = -\mathbb{E}_{(x,y) \sim (X,Y)} \sum_{k=1}^{M!} [y_k \log f_O(\phi)]$$

where $f_O$ is a linear classification function for COP, $\phi = \Omega(\Phi(x_1), \ldots, \Phi(x_M))$ is a ReLU activation of multi-layer perceptron (MLP), which takes M clip features as input, and (x,y) are data.

7. The method of claim 1, wherein a domain adversarial loss helps a shuffle and attend video domain adaptation (SAVA) model to align video-level features between the source and target videos.

8. A non-transitory computer-readable storage medium comprising a computer-readable program for performing video domain adaptation for human action recognition, wherein the computer-readable program when executed on a computer causes the computer to perform the steps of:
using annotated source data from a source video and unannotated target data from a target video in an unsupervised domain adaptation setting;
identifying and aligning discriminative clips in the source and target videos via an attention mechanism; and
learning spatial-background invariant human action representations by employing a self-supervised clip order prediction loss for both the annotated source data and the unannotated target data.

9. The non-transitory computer-readable storage medium of claim 8, wherein the attention mechanism suppresses temporal background clips.

10. The non-transitory computer-readable storage medium of claim 9, wherein the attention mechanism is learned jointly for video-level adaptation and classification.

11. The non-transitory computer-readable storage medium of claim 10, wherein the discriminative clips are selected by employing an auxiliary network such that video features are derived as a weighted combination of the identified discriminative clips.

12. The non-transitory computer-readable storage medium of claim 11, wherein the attention mechanism is pre-trained with a binary cross-entropy loss to obtain a ground truth attention vector.

13. The non-transitory computer-readable storage medium of claim 8, wherein the clip order prediction (COP) loss is given as:

$$L_{COP} = -\mathbb{E}_{(x,y) \sim (X,Y)} \sum_{k=1}^{M!} [y_k \log f_O(\phi)]$$

where $f_O$ is a linear classification function for COP, $\phi = \Phi(\Psi(x_1), \ldots, \Phi(x_M))$ is a ReLU activation of multi-layer perceptron (MLP), which takes M clip features as input, and (x,y) are data.

14. The non-transitory computer-readable storage medium of claim 8, wherein a domain adversarial loss helps a shuffle and attend video domain adaptation (SAVA) model to align video-level features between the source and target videos.

15. A system for performing video domain adaptation for human action recognition, the system comprising:
a memory; and
one or more processors in communication with the memory configured to:
use annotated source data from a source video and unannotated target data from a target video in an unsupervised domain adaptation setting;
identify and align discriminative clips in the source and target videos via an attention mechanism; and
learn spatial-background invariant human action representations by employing a self-supervised clip order prediction loss for both the annotated source data and the unannotated target data.

16. The system of claim 15, wherein the attention mechanism suppresses temporal background clips.

17. The system of claim 16, wherein the attention mechanism is learned jointly for video-level adaptation and classification.

18. The system of claim 17, wherein the discriminative clips are selected by employing an auxiliary network such that video features are derived as a weighted combination of the identified discriminative clips.

19. The system of claim 18, wherein the attention mechanism is pre-trained with a binary cross-entropy loss to obtain a ground truth attention vector.

20. The system of claim 15, wherein the clip order prediction (COP) loss is given as:

$$L_{COP} = -\mathbb{E}_{(x,y)\sim(X,Y)} \sum_{k=1}^{M!} [y_k \log f_O(\phi)]$$

where $f_O$ is a linear classification function for COP, $\phi = \chi(\Phi(x_1), \ldots, \Phi(x_M))$ is a ReLU activation of multi-layer perceptron (MLP), which takes M clip features as input, and (x,y) are data.

* * * * *